(12) United States Patent
Chiu

(10) Patent No.: US 8,447,130 B2
(45) Date of Patent: May 21, 2013

(54) HISTORY-BASED SPATIO-TEMPORAL NOISE REDUCTION

(75) Inventor: Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1182 days.

(21) Appl. No.: 11/967,754

(22) Filed: Dec. 31, 2007

(65) Prior Publication Data

US 2009/0167951 A1    Jul. 2, 2009

(51) Int. Cl.
G06K 9/62      (2006.01)
H04N 5/00      (2006.01)

(52) U.S. Cl.
USPC .......................................... 382/261; 348/607

(58) Field of Classification Search
USPC .......................................... 382/261; 348/607
See application file for complete search history.

(56) References Cited

U.S. PATENT DOCUMENTS

| | | | | |
|---|---|---|---|---|
| 5,715,335 | A * | 2/1998 | De Haan et al. | 382/265 |
| 7,034,892 | B2 * | 4/2006 | Ojo et al. | 348/607 |
| 7,145,607 | B1 * | 12/2006 | Hui | 348/607 |
| 7,317,842 | B2 * | 1/2008 | Lin et al. | 382/261 |
| 2002/0094130 | A1 * | 7/2002 | Bruls et al. | 382/261 |
| 2004/0119861 | A1 * | 6/2004 | Bosco et al. | 348/272 |
| 2005/0094889 | A1 * | 5/2005 | Lin et al. | 382/261 |
| 2005/0128355 | A1 * | 6/2005 | Kang et al. | 348/606 |
| 2005/0280739 | A1 * | 12/2005 | Lin et al. | 348/607 |
| 2007/0014368 | A1 * | 1/2007 | MacInnis et al. | 375/240.24 |
| 2007/0139568 | A1 * | 6/2007 | Zhong et al. | 348/701 |
| 2007/0195199 | A1 * | 8/2007 | Chen et al. | 348/607 |
| 2008/0204600 | A1 * | 8/2008 | Xu et al. | 348/607 |
| 2010/0027840 | A1 * | 2/2010 | Roberts et al. | 382/103 |

FOREIGN PATENT DOCUMENTS

WO     WO 2006/114951     11/2006

OTHER PUBLICATIONS

"Motion Adaptive Spatio-Temporal Gaussian Noise Reduction Filter for Double-Shot Images," Shao-Yi Chien, et al., 2007 IEEE International Conference on Multimedia and Expo, 2007, pp. 1659-1662.*

(Continued)

Primary Examiner — Wenpeng Chen
(74) Attorney, Agent, or Firm — Trop, Pruner & Hu, P.C.

(57) ABSTRACT

Implementations of a history-based temporal motion noise filtering technique that considers the temporal smooth among multiple pictures as well as the block-based technique to estimate the noise/motion history to better reflect the spatial/temporal smoothness in the local neighborhood are provided. In particular, implementations of the per-pixel blending technique in the block-based noise measurement may be used to better manipulate pixels in both the spatial and temporal domains. A global noise detection technique may be used to estimate the occurrence and/or strength of the noise. A content adaptive spatial filtering content adaptive spatial filter based on a local edge measurement may be used to reduce picture noise as well as preserve edge sharpness. Implementations may be configured for various applications. In particular, programmability options allow users to specify the filter parameters for singularity detection, spatial-only, temporal-only and spatial-temporal filters to achieve user desirable viewing experience.

13 Claims, 4 Drawing Sheets

OTHER PUBLICATIONS

"A Fast Video Noise Reduction Method by Using Object-Based Temporal Filtering," Thou-Ho (Chao-Ho) Chen, et al, Third International Conference on Intelligent Information Hiding and Multimedia Signal Processing, 2007. vol. 2, pp. 515-518.*

"Novel Adaptive Temporal Filter Based on Motion Compensation for Video Noise Reduction," Li Yan et al. International Symposium on Communications and Information Technologies, 2006, pp. 1031-1034.*

Chinese Patent Office, OA for Chinese Application No. 200810190253.4, dated Oct. 8, 2010, 3 pgs.

Chinese Patent Office, 4th Office Action issued in corresponding Chinese Application No. 200810190253.4, dated Mar. 27, 2012, (6 pages).

* cited by examiner

HISTORY-BASED SPATIO-TEMPORAL NOISE REDUCTION

BACKGROUND

Implementations of the claimed invention generally may relate to the field of noise detection, noise reduction, noise removal and in particular to noise estimation and reduction in images and/or video.

Reducing the noise artifact is an important factor in the field of video processing. On the receiving end of an image/video application, people usually apply noise reduction technique as part of the post-processing filtering to improve picture quality. Media processors may reduce noise artifact by using approaches that rely on motion compensation, motion adaptive, temporal or spatial filters. In particular, although the motion compensation approach may achieve a desired filtering effect, extensive amounts of computation and memory spending in the motion search may be required to determine the best temporal correlation to reduce the noise artifact. Motion adaptive and temporal approaches do not require the extensive motion search but may achieve similar levels of picture quality with a smart design of filtering.

Conventional motion adaptive noise reduction methods are unable to deliver superior visual quality due to the failure of proper estimating the amount of motion in a video sequence by taking the temporal difference without considering the local spatial content.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Implementations provide a history-based content adaptive spatial-temporal motion adaptive technique that may be applied to a noise reduction system in areas including but not limited to video processors, image processors, display processors and media processors. Image and video visual quality may be enhanced by reducing the noise artifact caused by the process of video capturing, transmission, coding and storage. In particular, image and video visual quality may be enhanced by utilizing global noise detection, noise/motion history and spatial-temporal noise reduction filtering. A history-based content analysis may be provided by utilizing motion detection and local complexity to adapt the level of temporal noise reduction and to produce noise history information to be utilized for future pictures. Block-based or pixel-based noise history data may be referred to for future pictures to achieve better temporal noise reduction. Noise may be reduced by per-pixel based spatial/temporal noise reduction filtering with the block-based indication of noise history to perform noise reduction.

Figure 1:
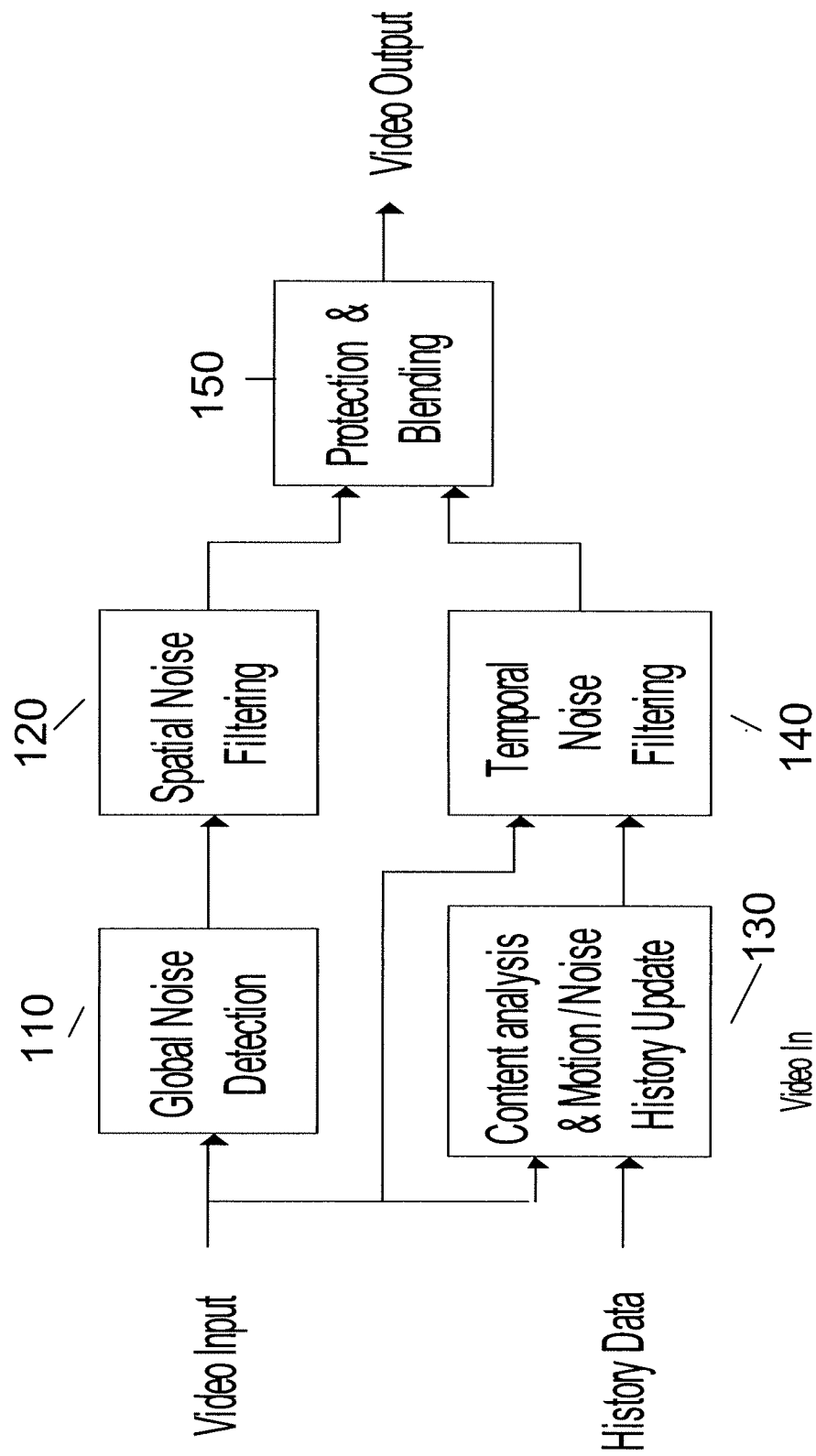
FIG. 1 illustrates an example noise reduction system according to some implementations.

FIG. 1 is a diagram illustrating an example of a noise reduction system 100 in accordance with one embodiment. System 100 may include global noise detection 110, spatial noise filtering 120, content analysis and motion/noise history update 130, temporal noise filtering 140 and protection and blending 150. These will be explained in greater detail below. Although components 210-290 are shown separately for ease of explanation, their respective functionalities may be combined in one or more modules in some implementations. Components 110-150 may be implemented via hardware, firmware, software, or some combination thereof. System 100 may also include other components incident to its operation as a noise filtering system for images and/or video, such as an additional logic, processor(s), a display on which to show the noise-filtered data, etc. Although such additional components are not explicitly shown in FIG. 1 for ease and brevity of description, they may nonetheless be present in noise filtering system 100.

Video input may be from any type of storage or transmission media that may operate as source of video information. For example, input may be from a memory, such as a frame buffer, to temporarily store one or more images or frames within a stream of video information. The video information may be encoded in any known or later-developed video encoding scheme or standard, including but not limited to MPEG-1, MPEG-2, MPEG-4, H.264, VC1, and/or Advanced Video System (AVS) formats.

In particular, global noise detection 110 may detect the occurrence of noise and estimates the level of noise strength. Global noise detection 110 may be performed using various techniques, including an embodiment of a technique described in U.S. Pat. No. 7,983,501, entitled "Noise Detection and Estimation Techniques for Picture Enhancement" and issued on Jul. 19, 2011. In that technique, noise detector 110 may be arranged to examine an image or frame of picture or video data and to determine a global noise measure for the whole image or frame. Noise detector 110 needs only examine pixels in a single image to determine the noise measure to be sent to noise filter 120, but noise detector 110 may use, for example, one or more prior noise measures to temporally smooth or average the global noise measure for the current image.

With the noise detected, spatial noise reduction and temporal noise reduction filtering may be performed in parallel. Spatial noise filtering 120 maybe performed using various techniques, including an embodiment of a technique described in U.S. patent publication 2006-0274962, entitled "Systems and Methods for Improved Gaussian Noise Filtering" and published on Dec. 7, 2006. Spatial noise filtering 120 may be a content adaptive threshold filter with the flexibility to adjust the reduction level based on the edge detection. Content analysis and motion/noise history update 130 calculates the motion, noise and spatial content information to adapt the temporal weighting and to update the history data. Temporal noise filtering 140 may be history-based to maximally reduce the temporal noise with the knowledge of past reference pictures. Protection and blending 150 may blend the filtering output intelligently to reduce noise artifact.

Figure 2:
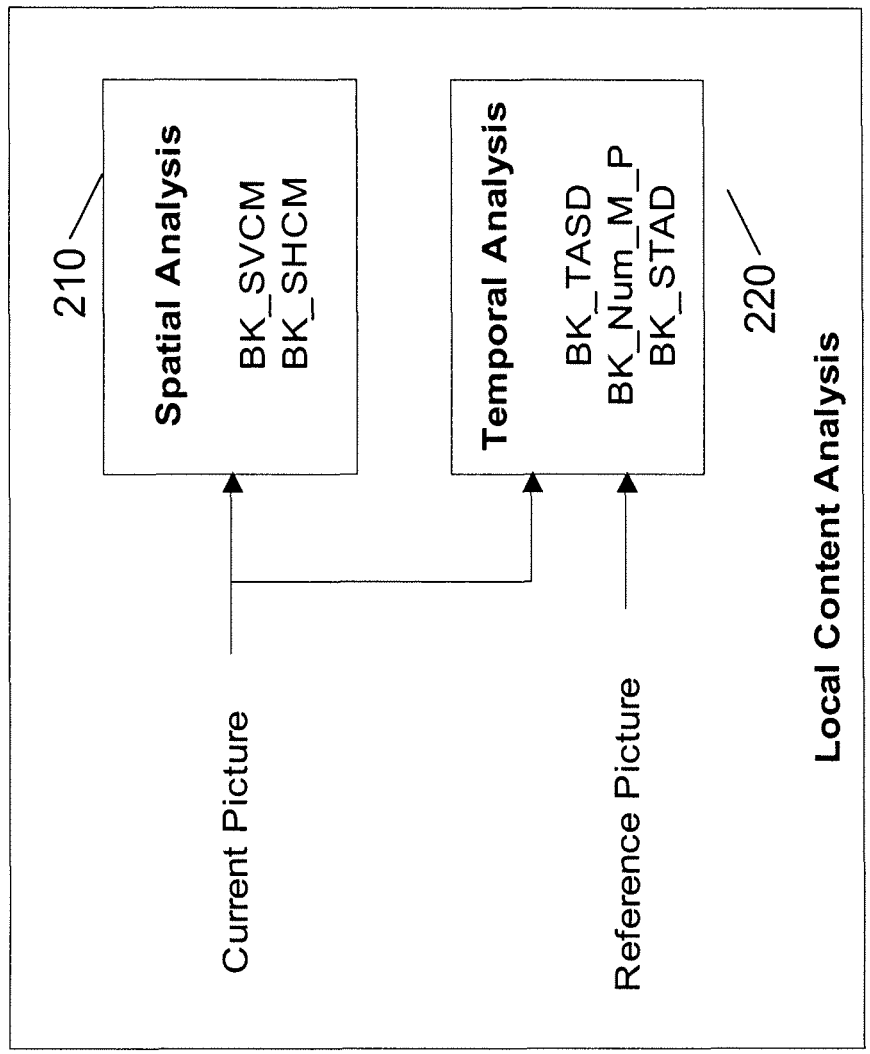
FIG. 2 illustrates an example of content analysis and motion/noise history update of FIG. 1.

FIG. 2 illustrates an example of content analysis and motion/noise history update 130. Content analysis may be provided in both the spatial and temporal domain for a block of pixels. For example, for a pixel located (x,y) in a target block of a current picture, expressed as curr(x,y), a block-based sum of horizontal complexity measure (BK_SHCM) and a block-based sum of vertical complexity measure (BK_SVCM) may be expressed as:

$$BK\_SHCM = \sum_x \sum_y abs(curr(x, y) - curr(x+1, y))$$

$$BK\_SVCM = \sum_x \sum_y abs(curr(x, y) - curr(x, y+1))$$

A block-based spatial complexity measure (BM_SCM) may be expressed as:

BK_SCM=BK_SHCM+BK_SVCM

A temporal measure of the block-based sum of temporal absolute difference (BK_STAD) for the target block may be expressed as:

$$BK\_STAD = \sum_x \sum_y abs(curr(x, y) - ref(x, y))$$

The pixel at (x,y) of the reference picture may be expressed as ref (x,y) which the reference picture could be the previous picture or the next picture in temporal direction.

A block-based absolute sum of temporal difference (BK_TASD) for the target block may be expressed as:

$$BK\_TASD = abs\left(\sum_x \sum_y (curr(x, y) - ref(x, y))\right)$$

A count of motion pixels for the target block BK_Num_M_P may be defined as the pixel satisfying the expression:

abs(curr(x,y)−ref(x,y))>predefined_threshold

Temporal Weight and History Update—Based-Based

Figure 3:
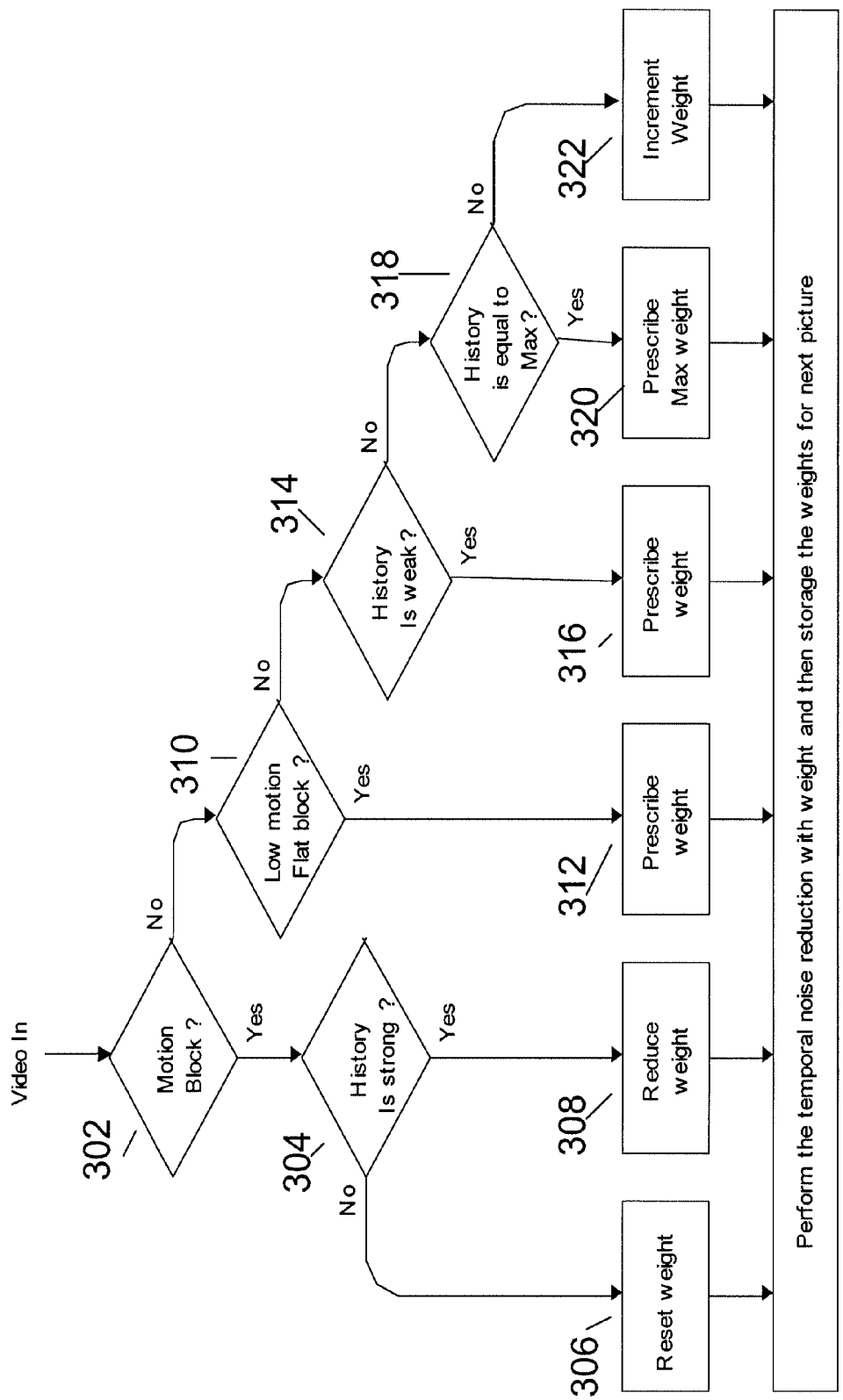
FIG. 3 illustrates an implementation of a method for block-based temporal weight calculation and noise history update of FIG. 1.

FIG. 3 illustrates an implementation of a method for block-based temporal weight calculation and noise history update. Although the method may be implemented by content analysis and motion/noise history update 130 and temporal noise filtering 140 shown in FIG. 1, the method described in FIG. 3 should not be construed as limited to the particulars of these other figures.

The method may begin with determining whether the target block is a motion block (act 302). In some implementations, the property of the motion block may be examined in accordance with BK_STAD passes rather than a pre-defined threshold and/or the count of BK_Num_P being larger than a pre-defined threshold number.

If the target block is determined to be a motion block in act 302, the history of the temporal weighting value may be considered (act 304). The temporal weighting value may be reset (i.e. reduced) (act 306) if the value of history weighting is larger than a predefined value (i.e. strong), otherwise the temporal weighting value may be reduced (act 308).

If the target block is not determined to be a motion block in act 302, it is determined whether the target block is smaller than a predefined value (i.e. slow) motion block or a flat block (act 310). In some implementations, whether a target block is a slow motion block may be determined in accordance with the expression BK_TASD noted above. In some implementations, whether a target block is a flat block may be determined in accordance with the expression BK_SCM noted above.

When the target block is detected as a non-motion block (act 302) but determined to be a flat or low motion block (step 310), temporal weighting value may be set to a predefined value (step 312).

When the target block is detected as a non-motion block (act 302) and not a flat or low motion block (step 310), temporal weighting value may be set to a predefined value (act 316) if the history weighting value is determined to be weak (i.e. small) (act 314). Else if the history weighting value is not determined to be weak (act 314) and the history weighting value is equal to a predefined maximum allowable weighting value (act 318), the temporal weighting value may be set to the predefined maximum allowable temporal weighting value (act 320). Otherwise, if the history weighting value is not determined to be weak (act 314) and the history weighting value is not equal to the predefined maximum allowable weighting value (act 320), the temporal weighting value may be increased (act 322). In act 324, the temporal noise reduction may be performed with the determined weight (from acts 306,208, 312, 316, 320 or 322) and the weights stored for the next picture.

In some implementations, the temporal weighting calculation and history update may be block-based; i.e., all of the pixels inside the target block share the identical temporal weighting and history value. Additionally, the property of block-based operation may be scalable down to the per-pixel level without heavy complexity constraint.

Protection and Blending—Pixel-Based

In some implementations, the temporal noise reduction filtering may be expressed in an 8-bit formula as follows:

temporal_denoised=(256−new_denoise_history)*
    curr(x,y)+new_denoise_history*ref(x,y)+128)>>8

In some implementations, an outcome of temporal noise reduction from the local spatial neighborhood may be protected as follows:

if (temporal_denoised>=block_max)

temporal_denoised=(temporal_denoised+
    block_max)>>1 if (temporal_denoised<=block_min)

temporal_denoised=(temporal_denoised+
    block_min)>>1;

The block_max may be the maximum pixel value of the local spatial neighborhood, and the neighborhood may consist of nearby pixels to the target pixel. For example, in some implementations this may be a 3×3 neighborhood centered at the target pixel. Similarly, the block_min may be the minimum value of the local spatial neighbor.

Figure 4:
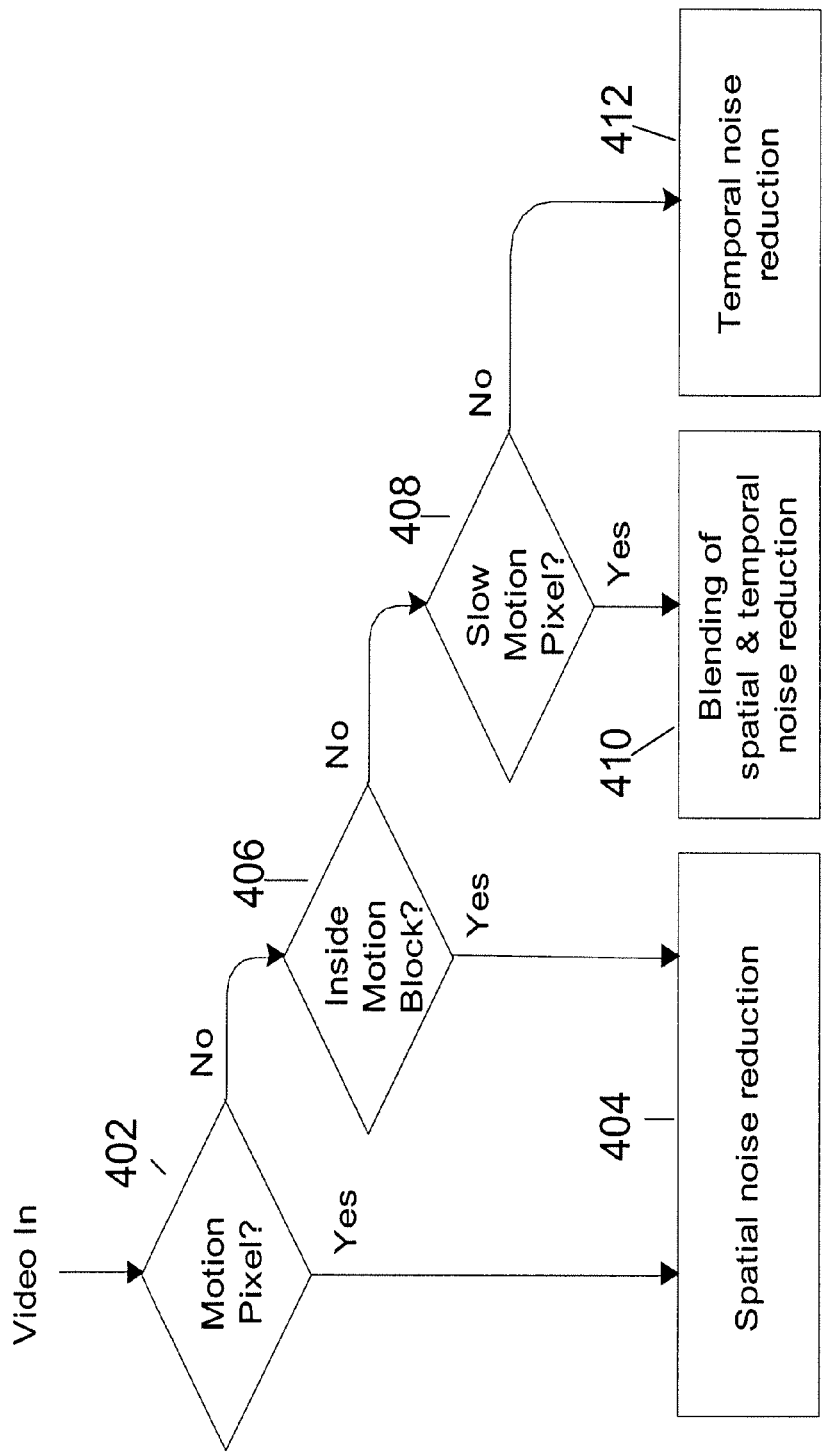
FIG. 4 illustrates an implementation of a method for per-pixel based protection and blending of outcome of the spatial noise reduction and temporal noise reduction.

FIG. 4 illustrates an implementation of a method for per-pixel based protection and blending of outcome of the spatial noise reduction and temporal noise reduction. Although the method may be implemented by protection and blending 150 shown in FIG. 1, the method described in FIG. 4 should not be construed as limited to the particulars of these other figures.

In act 402, it determined whether a target pixel is a motion pixel. In some implementations this may be determined by whether the temporal difference t_diff is larger than a predefined threshold value, expressed as t_diff_th. t_diff may be expressed as the absolute difference between the target pixel and a co-located pixel in the reference picture. Spatial noise reduction filtering is applied if the pixel is a motion pixel (act 404).

If the target pixel is not determined to be a motion pixel (act 402), it is determined whether the target pixel is located inside the motion block (act 406). If so, spatial noise reduction is adopted to smooth the target block (act 404).

If the target pixel is not determined to be a motion pixel (act 402) and not inside motion block (act 406), it is determined whether the pixel is a slow motion pixel (act 408). In some implementations, this may be determined by whether t_diff is larger than a predefined threshold value t_diff_th_low. If so, the blending of spatial and temporal noise reduction may be applied (act 410). In some implementations, blending may be expressed as follows:

Blending={spatial_denoised*(t_diff−t_diff_th_low)+
   temporal_denoised*(t_diff_th−t_diff)+
   (t_diff_th−t_diff_th_low)/2}/(t_diff_th−
   t_diff_th_low)

If not, the temporal noise reduction may be applied (act 412).

In accordance with some implementations, better quality may be achieved by utilization of history based information to maximize the temporal smoothness across many pictures. The block-based technique may be used to measure the motion/noise history to preserve the smoothness of multiple pixels and to reduce the storage/bandwidth and compute complexity. The blending technique may also be used to protect the filtering result among spatial and temporal filtering to achieve better visual quality.

As noted above, implementations of a history-based temporal motion noise filtering technique that considers the temporal smooth among multiple pictures as well as the block-based technique to estimate the noise/motion history to better reflect the spatial smoothness in the local neighborhood are provided. In particular, implementations of the per-pixel blending technique in the block-based noise measurement may be used to better manipulate pixels in both the spatial and temporal domains. A global noise detection technique may be used to estimate the occurrence and/or strength of the noise. A content adaptive spatial filtering content adaptive spatial filter based on a local edge measurement may be used to reduce picture noise as well as preserve edge sharpness. Implementations may be configured for various applications. In particular, programmability options allow users to specify the filter parameters for singularity detection spatial-only, temporal-only and spatial-temporal filters to achieve user desirable viewing experience.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method comprising:
   using a history of a measure of motion of a block in a series of at least three video frames;
   using a history of a measure of noise of the block in the series for temporal noise reduction;
   determining whether a particular block is a motion block because it has at least a given level of motion; and
   evaluating a history of temporal weighting value and resetting the temporal weighting value if the value of history weighting is larger than a predefined value.

2. The method of claim 1 including using motion detection to adapt a level of temporal noise reduction filtering.

3. The method of claim 1 including, if the target block is not a motion block, determining whether the target block has a first level of motion below a threshold or is a flat block.

4. The method of claim 3 wherein if said block is not a motion block, setting a temporal weighting value to a predefined value.

5. The method of claim 4 including if the block is not a motion block, setting a temporal weighting value to a predefined value based on the history weighting value.

6. The method of claim 5 including if the history weighting value is equal to a prescribed maximum allowable weighting value, setting the temporal weighting value to a predefined maximum allowable temporal weighting value.

7. The method of claim 6 including performing temporal noise reduction with predefined weights and storing the weights for the next frame.

8. The method of claim 1 including performing temporal weighting calculation and history update on the block basis.

9. The method of claim 1 including performing temporal weighting calculation and history update on a per pixel basis.

10. The method of claim 1 including applying spatial noise reduction filtering if the pixel is a motion pixel.

11. The method of claim 10 including applying spatial noise reduction if a pixel is not a motion pixel, but is located inside a motion block.

12. The method of claim 11 including blending spatial and temporal noise reduction if a pixel is not determined to be a motion pixel and is not inside a block determined to be a motion block and if the pixel has a motion below a particular level.

13. A method comprising:
   using a history of a measure of motion of a block in a series of at least three video frames;
   using a history of a measure of noise of the block in the series for temporal noise reduction;
   applying spatial noise reduction if a pixel is not a motion pixel, but is located inside a motion block; and
   blending spatial and temporal noise reduction if a pixel is not determined to be a motion pixel and is not inside a block determined to be a motion block and if the pixel has a motion below a particular level.

* * * * *